United States Patent [19]

Van Hooff

[11] Patent Number: 4,693,080

[45] Date of Patent: Sep. 15, 1987

[54] HYDRAULIC CIRCUIT WITH ACCUMULATOR

[75] Inventor: Henricus J. J. M. Van Hooff, Papendrecht, Netherlands

[73] Assignee: Van Rietschoten & Houwens Technische Handelmaatschappij B.V., Rotterdam, Netherlands

[21] Appl. No.: 777,366

[22] Filed: Sep. 18, 1985

[30] Foreign Application Priority Data

Sep. 21, 1984 [NL] Netherlands ........................ 8402899

[51] Int. Cl.[4] ............................................. F16D 31/02

[52] U.S. Cl. ......................................... 60/414; 60/417

[58] Field of Search ................. 60/371, 413, 414, 415, 60/417

[56] References Cited

U.S. PATENT DOCUMENTS

| | | | |
|---|---|---|---|
| 3,903,696 | 9/1975 | Carman | 60/414 |
| 3,945,207 | 3/1976 | Hyatt | 60/416 |
| 3,971,215 | 7/1976 | Baron et al. | 60/413 |
| 4,026,107 | 5/1977 | Kosek et al. | 60/413 |
| 4,098,083 | 7/1978 | Carman | 60/414 |
| 4,098,144 | 7/1978 | Besel et al. | 60/413 |
| 4,553,391 | 11/1985 | Reinhardt | 60/413 |

FOREIGN PATENT DOCUMENTS

| | | | |
|---|---|---|---|
| 3217527 | 11/1983 | Fed. Rep. of Germany . | |
| 2106337 | 5/1972 | France . | |
| 0113802 | 9/1981 | Japan | 60/413 |
| 2115492 | 9/1983 | United Kingdom . | |

*Primary Examiner*—Edward G. Favors

*Attorney, Agent, or Firm*—Ladas & Parry

[57] ABSTRACT

A hydraulic circuit for actuating a first hydraulic motor with an under pressure, i.e. pressurized fluid has an externally driven first hydraulic pump for introduction of fluid into the circuit from an open reservoir and a hydraulic accumulator to keep stand-by pressure fluid, the pressure in the accumulator being sufficient to actuate the first hydraulic motor. A fluid pressure intensifier, i.e. a second hydraulic motor and a second hydraulic pump coupled therewith, is also in the circuit. The second hydraulic pump has a smaller swept volume than the second hydraulic motor, and both are connected to an outlet of the first hydraulic pump for the second hydraulic pump to pump into an inlet of the hydraulic accumulator.

4 Claims, 2 Drawing Figures

HYDRAULIC CIRCUIT WITH ACCUMULATOR

Figure 1:
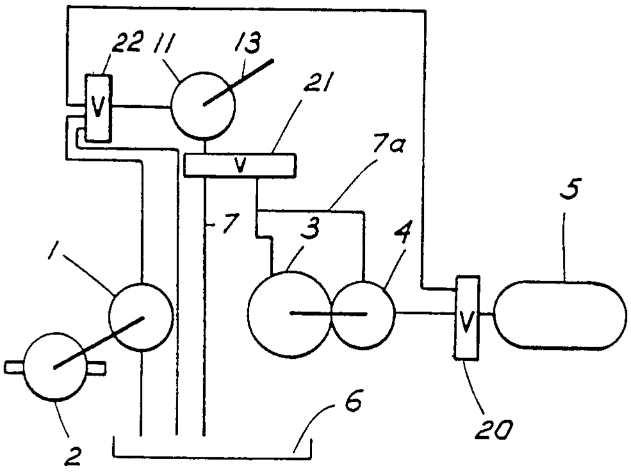

The invention relates to a hydraulic circuit for actuating a first hydraulic motor with an under pressure, i.e. pressurized, fluid having, more specifically an open reservoir, an externally driven first hydraulic pump for taking in fluid from the open reservoir and a hydraulic accumulator to keep taken-in fluid on stand-by, the pressure in the accumulator being sufficient to actuate the first hydraulic motor.

Such a hydraulic circuit is generally known. In the known hydraulic circuit, the external drive of the first hydraulic pump is an electromotor in which the first hydraulic pump is used both for driving the first hydraulic motor and for the introduction of fluid into the hydraulic accumulator. In this way, one can economize on the rated output of the first hydraulic pump, since the first hydraulic pump and the hydraulic accumulator can be operated simultaneously to actuate the first hydraulic motor.

According to the invention, a further economization is achieved in a hydraulic circuit of the above type by a fluid pressure intensifier comprising a second hydraulic motor and a second hydraulic pump coupled therewith. The second hydraulic pump has a smaller swept volume than the second hydraulic motor. The second hydraulic motor is interconnected in a discharge pipe connected to an outlet of the first hydraulic pump and an outlet of the second hydraulic pump is connected to an inlet of the hydraulic accumulator.

The circuit according to the invention has the advantage that with an externally driven first hydraulic pump of low rating a body of fluid can be kept stand-by in the hydraulic accumulator under a pressure not attainable by the first hydraulic pump in case of extreme load on the hydraulic motor.

A further advantage of the hydraulic circuit according to the invention becomes apparent when the first hydraulic motor is reversible and is being externally driven as the first hydraulic pump. In general, the first hydraulic pump would then serve as a brake, for instance on the load driven by the first hydraulic motor. In this way, a considerable portion of the potential energy of the load can be stored in the hydraulic accumulator.

The invention is elucidated in the following description of two embodiments. The description refers to a drawing in which FIG. 1 schematically shows a first embodiment; and FIG. 2 schematically shows a second embodiment motor.

The figures show the component parts of each embodiment for three different operative states of the circuit. FIG. 1 relates to a circuit in which a first hydraulic motor 11 is of the rotating type. FIG. 2 relates to a circuit in which a first hydraulic motor 12 is of the reciprocating type. In both cases, the hydraulic motors are reversible to function as hydraulic pumps when reversed.

In both Figs., a first hydraulic pump 1, 1' is drivingly coupled with an electromotor 2, 2', a second hydraulic motor 3, 3' is fixedly coupled with a second hydraulic pump 4, 4' and valves 20 to 24 variably connect these to a hydraulic accumulator 5, 5', an open fluid reservoir 6, 6' and a discharge pipe 7, 7'. The embodiment of FIG. 1 has a first reversible hydraulic motor 11 of the rotating type having an output shaft 13, and that of FIG. 2 has a first reversible hydraulic motor 12 of the reciprocating type provided with a piston 14.

Figure 2:
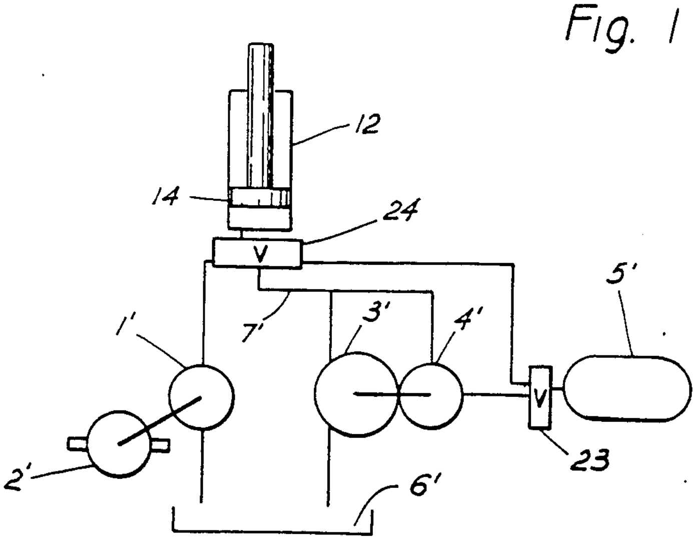

In the embodiments of FIGS. 1 and 2, for driving the first hydraulic motor 11, 12 by the first hydraulic pump 1, 1' while it is actuated by electromotor 2, 2', valves 22, 24 are operated so that fluid is pumped from the open fluid reservoir 6, 6' to the first hydraulic motor 11, 12, respectively. In the rotating embodiment of FIG. 1 with the first hydraulic motor, the pumped fluid then returns to the reservoir 6 through valve 21 and outlet 7. In the embodiment of FIG. 2 with reciprocating hydraulic motor 12, the latter absorbs the pumped fluid.

In recovering energy with the first hydraulic motor 11 of FIG. 1 from motion of the output shaft 13 of the first hydraulic motor 11, for instance due to it being connected to a mass in motion, this motion is stopped. In its capacity of hydraulic pump, the first hydraulic motor 11 then functions as a brake by driving the second hydraulic motor 3 through valve 21 and its other discharge pipe *7a*, said second hydraulic motor, having an output shaft as the fixed coupling to the second hydraulic pump 4, then also causing the hydraulic pump 4 to introduce fluid from the discharge pipe *7a* into the hydraulic accumulator 5 against the high pneumatic pressure prevailing therein. At a ratio k of the swept volume of the second hydraulic motor 3 to the swept volume of the hydraulic pump 4, this implies that the fraction 1/k of the fluid displaced when braking with the hydraulic motor 11 can be stored in the accumulator 5 under pressure which is sufficient for setting the greatest mass rated for the first hydraulic motor 11 in motion. Said sufficient pressure is determined by the pneumatic pressure in the accumulator 5.

In FIG. 2 the only difference is that checking the motion of the piston 14 is the braking issue, which piston for instance absorbs the potential energy of a mass lifted against gravity with the reciprocating motor 12. Accordingly the transformer, i.e. second hydraulic motor and pump 3', 4', transfers a portion of this potential energy to the accumulator 5 through valves 23, 24, again at a sufficiently high pressure level so that it can subsequently be used for lifting the heaviest mass rated.

To use the energy stored in the accumulator 5, 5', valves 20, 23 connect an outlet of accumulator 5, 5' with the pressure inlet to the first hydraulic motor 11, 12, respectively.

The amount of serviceable energy which is saved up for the next actuation of the first hydraulic mtoor 11, 12 in the order of the fraction 1/k of the energy that is released when checking the motion of the load.

The ratio k is essentially determined by the minimum load on the first hydraulic motor, for example only the mass of the loading beam of a lifting appliance such as a lifting platform, or the mass of an empty, hydraulically driven, transport wagon, and the maximum load on the first hydraulic motor, i.e. the maximum load to be lifted included, or the heaviest loaded wagon to be moved respectively, both determined by the mechanical strength of the bearing structure.

The recovered energy can be derived from the motion of the minimum load, but it has to be at the level for setting the heaviest load into motion.

Although the pressure intensifier or transformer 3 and 4 or 3' and 4' has been described as a rotating machine, it can also be embodied as a reciprocating machine, that is when the fluid body to be moved by the first hydraulic motor is relatively small. Otherwise, the dimensions of the pressure intensifier would be too large for practical application.

In a rotating machine the ratio k can be adjusted with a transmission hydraulic pump.

I claim:

1. A hydraulic circuit for actuating a first hydraulic motor with an under pressure fluid, comprising an externally driven first hydraulic pump for introduction of fluid into the circuit from an open reservoir and hydraulic accumulator to keep the introduced body of under pressure fluid stand-by, the pressure in the accumulator being sufficient to actuate the first hydraulic motor, characterized by a fluid pressure intensifier comprising a second hydraulic motor (3) and a second hydraulic pump (4) coupled therewith, wherein the second hydraulic pump (4) has a smaller swept volume than the second hydraulic motor (3), and the second hydraulic motor (3) is interconnected in a discharge pipe (7) connected to an outlet of the first hydraulic pump (11) and an outlet of the second hydraulic pump (4) is connected to an inlet of the hydraulic accumulator (5) to introduce a fluid body obtained from discharge pipe (7) into the hydraulic accumulator (5), the second hydraulic motor (3) and the second hydraulic pump (4) being of the rotating type.

2. A hydraulic circuit according to one of the claim 1, characterized in that the first hydraulic motor (11) is reversible and can be externally driven as first hydraulic pump.

3. A hydraulic circuit according to one of the claim 1, characterized in that the external drive of the first hydraulic pump (11) is derived from a relatively low power source.

4. A hydraulic circuit according to claim 3, characterized in that the relatively low power source is a mass flow.

* * * * *